United States Patent
Van Nee (10) Patent No.: US 8,767,524 B2
(45) Date of Patent: Jul. 1, 2014

(54) TRAINING SEQUENCES FOR VERY HIGH THROUGHPUT WIRELESS COMMUNICATION

(75) Inventor: Didier Johannes Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 13/085,171

(22) Filed: Apr. 12, 2011

(65) Prior Publication Data
US 2011/0211594 A1   Sep. 1, 2011

Related U.S. Application Data

(63) Continuation-in-part of application No. 12/365,802, filed on Feb. 4, 2009, now Pat. No. 8,155,138.

(60) Provisional application No. 61/323,549, filed on Apr. 13, 2010, provisional application No. 61/090,134, filed on Aug. 19, 2008.

(51) Int. Cl.
*H04J 11/00*   (2006.01)
*H04L 12/26*   (2006.01)

(52) U.S. Cl.
USPC .......................... 370/208; 370/210; 370/252

(58) Field of Classification Search
USPC ................ 370/203, 204, 208, 210, 241, 252
See application file for complete search history.

(56) References Cited

U.S. PATENT DOCUMENTS

| 7,116,271 B2 | 10/2006 | Kostanic et al. |
| 7,986,742 B2 | 7/2011 | Ketchum et al. |

(Continued)

FOREIGN PATENT DOCUMENTS

| JP | 2006287757 A | 10/2006 |
| TW | 200805930 A | 1/2008 |

(Continued)

OTHER PUBLICATIONS

International Search Report and Written Opinion—PCT/US2011/032366—ISA EPO—Aug. 11, 2011.

(Continued)

*Primary Examiner* — Omar Ghowrwal
(74) *Attorney, Agent, or Firm* — Eric Ho (57) ABSTRACT

Methods and systems for communications that generate a plurality of spatial streams, wherein each of the spatial streams comprises a data packet with a training sequence; and multiply at least a portion of the training sequence in each of the spatial streams with a different spreading sequence. Methods and systems that receive a plurality of spatial streams, wherein each of the spatial streams comprises a data packet with a training sequence; multiply at least a portion of the training sequence in each of the spatial streams with a different spreading sequence; and decode the plurality of spatial streams based on the different spreading sequences.

47 Claims, 6 Drawing Sheets

(56) References Cited

U.S. PATENT DOCUMENTS

| | | | |
|---|---|---|---|
| 8,155,138 B2 | 4/2012 | Van Nee | |
| 2002/0085620 A1 | 7/2002 | Mesecher | |
| 2005/0152357 A1 | 7/2005 | Stephens | |
| 2005/0180360 A1* | 8/2005 | Hansen et al. | 370/334 |
| 2005/0220199 A1* | 10/2005 | Sadowsky et al. | 375/260 |
| 2006/0195610 A1* | 8/2006 | Cole et al. | 709/245 |
| 2006/0227892 A1* | 10/2006 | Ouyang et al. | 375/267 |
| 2007/0064735 A1 | 3/2007 | Hoo et al. | |
| 2007/0253501 A1 | 11/2007 | Yamaura | |
| 2007/0253505 A1 | 11/2007 | Kostanic | |
| 2008/0101492 A1* | 5/2008 | Gregoire et al. | 375/267 |
| 2008/0101942 A1 | 5/2008 | McGowan et al. | |
| 2008/0192846 A1 | 8/2008 | Bjerke et al. | |

FOREIGN PATENT DOCUMENTS

| | | |
|---|---|---|
| WO | WO2004038988 | 5/2004 |
| WO | WO2010021885 | 2/2010 |
| WO | WO2010021900 | 2/2010 |

OTHER PUBLICATIONS

IEEE Std 802.11a-1999, "Part 11: Wireless LAN Medium Access Control (MAC) and Physical Layer (PHY) specifications: High-speed Physical Layer in the 5 GHZ Band", Sep. 16, 1999 Fig. 110 and Part 17.3.2.1 of the Specification.

Taiwan Search Report—TW098127615—TIPO—Jan. 15, 2013.

IEEE P802.11n/D5.0, Draft Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 5: Enhancements for Higher Throughput, May 1, 2008.

* cited by examiner

TRAINING SEQUENCES FOR VERY HIGH THROUGHPUT WIRELESS COMMUNICATION

CROSS-REFERENCE TO RELATED APPLICATIONS

This application claims priority to U.S. Provisional Patent Application Ser. No. 61/323,549, entitled "TRAINING SEQUENCES FOR VERY HIGH THROUGHPUT WIRELESS COMMUNICATION", which was filed Apr. 13, 2010; and is a continuation-in-part of U.S. patent application Ser. No. 12/365,802, entitled "TRAINING SEQUENCES FOR VERY HIGH THROUGHPUT WIRELESS COMMUNICATION", filed Feb. 4, 2009, now issued as U.S. Pat. No. 8,155,138, which claims priority to U.S. Provisional Patent Application Ser. No. 61/090,134, entitled "MODIFIED STF AND LTF FOR ACCURATE VHT AGC POWER SETTING", which was filed Aug. 19, 2008. The entireties of the aforementioned applications are herein incorporated by reference.

BACKGROUND

I. Field

The following description relates generally to communication systems, and more particularly to modified training fields for automatic gain control power settings.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A new version of IEEE 802.11, referred to as Very High Throughput (VHT), employs MIMO to communicate with several receivers using Spatial-Division Multiple Access (SDMA). SDMA is a multiple access scheme that enables multiple streams transmitted to different receivers at the same time to share the same frequency spectrum. Within any given stream, there may be significant variations in power that could lead to large Automatic Gain Control (AGC) errors. Techniques to deal with such power variations are needed in the art.

SUMMARY

In one aspect of the disclosure, an apparatus for communications includes a processing system configured to generate a plurality of spatial streams, wherein each of the spatial streams comprises a data packet having a training sequence. The processing system is further configured to multiply at least a portion of the training sequence in each of the spatial streams with a different spreading sequence.

In another aspect of the disclosure, a method for communications includes generating a plurality of spatial streams, wherein each of the spatial streams comprises a data packet having a training sequence. The method further includes multiplying at least a portion of the training sequence in each of the spatial streams with a different spreading sequence.

In yet another aspect of the disclosure, an apparatus for communications includes means for generating a plurality of spatial streams, wherein each of the spatial streams comprises a data packet having a training sequence. The apparatus further includes means for multiplying at least a portion of the training sequence in each of the spatial streams with a different spreading sequence.

In a further aspect of the disclosure, a computer-program product for wireless communication includes a machine-readable medium encoded with instructions executable to generate a plurality of spatial streams, wherein each of the spatial streams comprises a data packet having a training sequence, and multiply at least a portion of the training sequence in each of the spatial streams with a different spreading sequence.

In yet a further aspect of the disclosure, an access point includes a wireless network adapter configured to support a backhaul connection for a peer node to a network; and a processing system. The processing system is configured to generate a plurality of spatial streams, wherein each of the spatial streams comprises a data packet having a training sequence. The processing system is further configured to multiply at least a portion of the training sequence in each of the spatial streams with a different spreading sequence.

In yet another aspect, an apparatus for communications includes a processing system configured to receive a plurality of spatial streams, wherein each of the spatial streams comprises a data packet having a training sequence, and wherein at least a portion of the training sequence in each of the spatial streams is multiplied with a different spreading sequence. The processing system is further configured to decode the plurality of spatial streams based on the different spreading sequences.

In yet another aspect of the disclosure, a method for communications includes receiving a plurality of spatial streams, wherein each of the spatial streams comprises a data packet having a training sequence, and wherein at least a portion of the training sequence in each of the spatial streams is multiplied with a different spreading sequence. The method further includes decoding the plurality of spatial streams based on the different spreading sequences.

In a further aspect of the disclosure, an apparatus for communications includes means for receiving a plurality of spatial streams, wherein each of the spatial streams comprises a data packet having a training sequence, and wherein at least a portion of the training sequence in each of the spatial streams is multiplied with a different spreading sequence, and means for decoding the plurality of spatial streams based on the different spreading sequences.

In yet a further aspect of the disclosure, a computer-program product for communication includes a machine-readable medium encoded with instructions executable to receive a plurality of spatial streams, wherein each of the spatial streams comprises a data packet having a training sequence, and wherein at least a portion of the training sequence in each of the spatial streams is multiplied with a different spreading sequence; and decode the plurality of spatial streams based on the different spreading sequences.

In yet another further aspect of the disclosure, an access terminal includes a processing system and a user interface supported by the processing system. The processing systems is configured to receive a plurality of spatial streams, wherein each of the spatial streams comprises a data packet having a training sequence, and wherein at least a portion of the training sequence in each of the spatial streams is multiplied with a different spreading sequence. The processing system is further configured to decode the plurality of spatial streams based on the different spreading sequences.

BRIEF DESCRIPTION OF THE DRAWINGS

These and other sample aspects of the training sequences for VHT wireless communication will be described in the detailed description that follow, and in the accompanying drawings, wherein.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein, one skilled in the art should appreciate that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Figure 1:
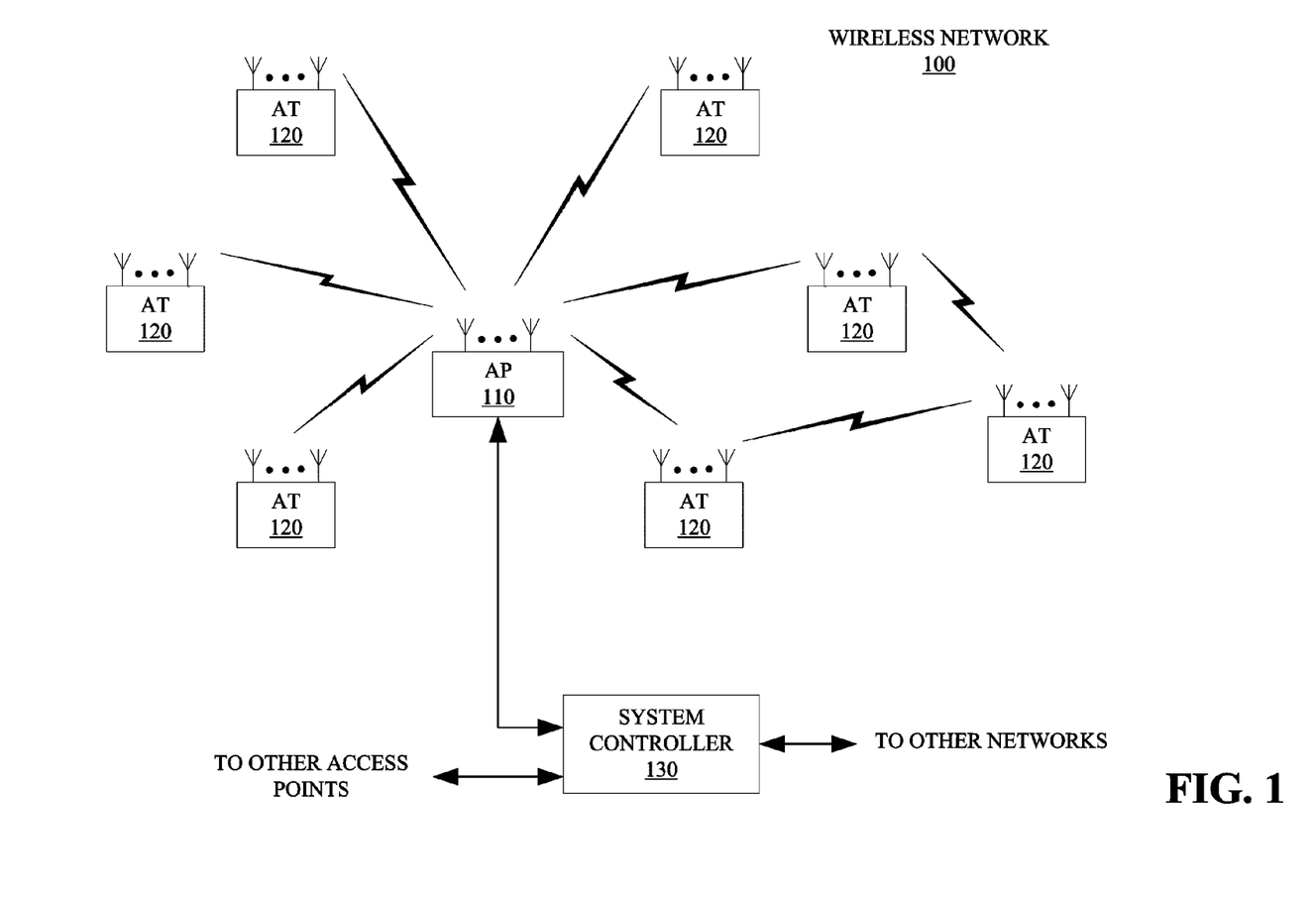
FIG. 1 is a conceptual diagram illustrating an example of a wireless communications network.

Several aspects of a wireless network will now be presented with reference to FIG. 1. The wireless network 100 is shown with several wireless nodes, generally designated as nodes 110 and 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage, however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using SDMA. As explained in the background section of this disclosure, SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream that enables the access point 110 to identify the source of each spatially precoded data stream.

One or more access terminals 120 may be equipped with multiple antennas to enable certain functionality. With this configuration, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the disclosed system will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard.

Other suitable wireless technologies include, by way of example, Code Division Multiple Access (CDMA), Time Division Multiple Access (TDMA), or any other suitable wireless technology, or any combination of suitable wireless technologies. A CDMA system may be implemented with IS-2000, IS-95, IS-856, Wideband-CDMA (WCDMA), or some other suitable air interface standard. A TDMA system may be implemented with Global System for Mobile Communications (GSM) or some other suitable air interface standard. As those skilled in the art will readily appreciate, the various aspects of the disclosed system are not limited to any particular wireless technology and/or air interface standard.

Figure 2:
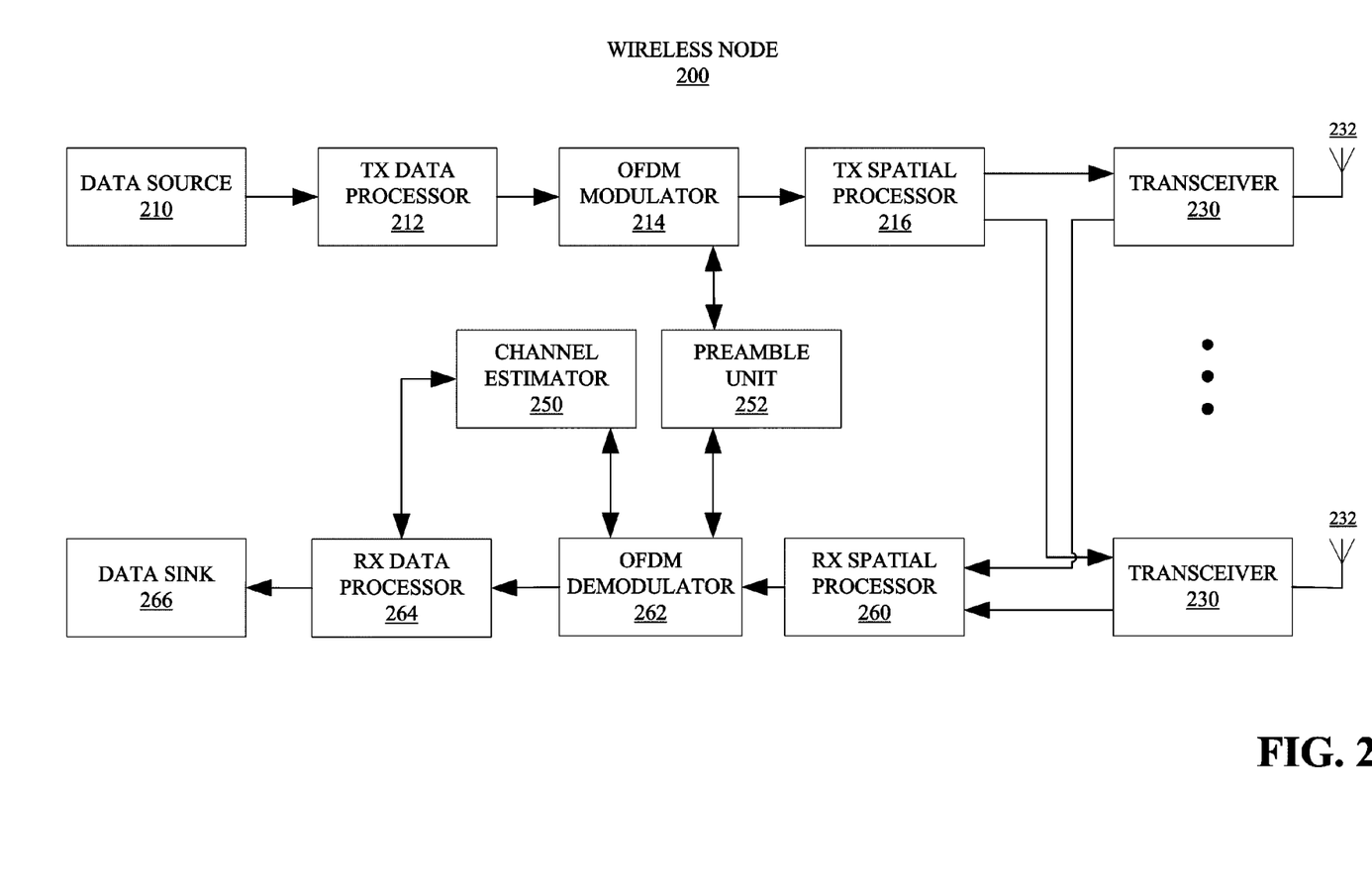
FIG. 2 is a block diagram illustrating an example of a wireless node.

FIG. 2 is a conceptual block diagram illustrating an example of a wireless node 200. In a transmit mode, a TX data processor 212 may be used to receive data from a data source 210 and encode (e.g., Turbo code) the data to facilitate Forward Error Correction (FEC) at the receiving node. The encoding process results in a sequence of code symbols that may be blocked together and mapped to a signal constellation by the TX data processor 212 to produce a sequence of modulation symbols.

In wireless nodes implementing OFDM, the modulation symbols from the TX data processor 212 may be provided to an OFDM modulator 214. The OFDM modulator 214 splits the modulation symbols into a number of parallel streams and then maps each stream to a subcarrier using some modulation constellation. An Inverse Fast Fourier Transform (IFFT) is then performed on each set of subcarriers to produce time domain OFDM symbols, with each OFDM symbol having a set of subcarriers. The OFDM symbols are distributed in the payloads of multiple data packets.

In at least one configuration of the wireless node 200, a preamble is carried along with the payload in each data packet. The preamble may be comprised of several symbols which are provided to the OFDM modulator 214 by a preamble unit 252. The OFDM modulator 214 splits the preamble symbols into a number of parallel streams, and then maps each stream to a subcarrier using some modulation constellation. An IFFT is then performed on each set of subcarriers to produce one or more time domain OFDM symbols which constitutes the preamble. The preamble is then appended to payload carried by each data packet before providing the data packets to a TX spatial processor 216.

The TX spatial processor 216 performs spatial processing on the data packets. This may be accomplished by spatially precoding the data packets into a number of spatially precoded streams and then providing each spatially precoded stream to a different antenna 232 via a transceiver 230. Each transceiver 230 modulates an RF carrier with a respective precoded stream for transmission over the wireless channel.

In a receive mode, each transceiver 230 receives a signal through its respective antenna 232. Each transceiver 230 may be used to recover the information modulated onto an RF carrier and provide the information to a RX spatial processor 260.

The RX spatial processor 260 performs spatial processing on the information to recover data packets carried any spatial streams destined for the wireless node 200. The spatial processing may be performed in accordance with Channel Correlation Matrix Inversion (CCMI), Minimum Mean Square Error (MMSE), Soft Interference Cancellation (SIC), or some other suitable technique.

The preamble unit 252 will use the preamble in each data packet to provide synchronization information to the OFDM demodulator 262. The OFDM demodulator 262 recovers the data carried on each subcarrier in the OFDM symbols in the payload of the data packet and multiplexes the data into a stream of modulation symbols. The OFDM demodulator 262 converts the stream from time-domain to the frequency domain using a Fast Fourier Transfer (FFT). The frequency domain signal comprises a separate stream for each subcarrier.

A channel estimator 250 receives the streams from the OFDM demodulator and estimates the channel response. As part of the preamble there may be a set of pilot signals. Each pilot signal will be generally shifted in phase due to the transmission through the wireless channel. The MMSE estimates of the phase shifted pilot signals are computed and the MMSE estimates are used to estimate phase errors and consequently the channel response. The channel response is provided to a RX data processor 264.

The RX data processor 264 is used to translate the modulation symbols back to the correct point in the signal constellation. Because of noise and other disturbances in the wireless channel, the modulation symbols may not correspond to an exact location of a point in the original signal constellation. Using the channel response, the RX data processor 264 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 264 then uses the sequence of code symbol LLRs and the phase error estimates in order to decode the data that was originally transmitted before providing the data to a data sink 266.

A preamble within each data packet includes a training sequence. A training sequence contains a number of modulated symbols. A training sequence may comprise a Short Training Field (STF) and/or a Long Training Field (LTF). IEEE 802.11n defines the use of a cyclic delayed (CD) STF, which will be referred to as a legacy STF, for up to only 4 transmit antennas. However, for IEEE-VHT, the STF needs to be extended to 8 transmit antennas. Because the STF is used at the receiver side for start-of packet detection and automatic gain control (AGC) settings. If the same STF approach is used in VHT as in IEEE 802.11n, AGC power setting accuracy will be significantly worse for cases where there are more than 4 antennas in use. For example, one issue related to power variation between STF and data is caused by the fact that, through the use of a delay spread, there exists a high correlation between the STF from different transmitters. As a cyclic delay diversity (CDD) of 200 ns is typically used, a multipath component with delay of 200 ns will have a perfect correlation with the STF of another transmitter.

Legacy STF uses 12 non-zero subcarrier values $s_k$ in each 20 MHz subchannel, k=1 . . . 12, which corresponds to subcarrier locations {−24, −20, −16, −12, −8, −4, 4, 8, 12, 16, 20, 24} within the 20 MHz subchannel, where:

$$s_k = \{1+j, -1-j, 1+j, -1-j, -1-j, 1+j, -1-j, -1-j, 1+j, 1+j, 1+j, 1+j\}.$$

However, as discussed above, simply using the legacy STF will not be sufficient for VHT.

In one aspect of the VHT STF system described herein, a modified STF is generated that minimizes power differences between the preamble and data part of a VHT packet while retaining the 800 ns repetition interval. The preamble unit 252 together with the OFDM modulator 214 creates preambles according to the following approaches. In one approach, the preambles are generated by multiplying at least a portion of the training sequence (such as the STF or the LTF) in each of the data packets with a different spreading sequence. The spreading sequences may be an orthogonal sequence. A CD or CCD may be applied to one or more of the different spreading sequences. Furthermore, each of the training sequences may have nonzero subcarriers, and each of the different spreading sequences may have k values.

When the number of data packets is m, at least a portion of the training sequence in each of the data packets is multiplied with a portion of an m×k matrix including the different spreading sequences. The matrix may be a Hadamard matrix. Alternatively, at least a portion of the training sequence in each of the data packets may be multiplied with an FFT matrix comprising the different spreading sequences. The following illustrates a few examples detailing some of the above mentioned configurations.

For example, to create a 20 MHz STF, the STF subcarriers of each transmitter is multiplied with a different length 12 orthogonal Hadamard sequence. STF subcarrier values $s_{mk}$ for transmitter or stream number m are defined as $$s_{mk} = w_{mk} s_k,$$

where $s_k$ are the 12 non-zero subcarrier values of the 802.11n STF symbol, as discussed above, and $w_{mk}$ are the +1/−1 values from the 12×12 orthogonal Hadamard matrix.

An example of Hadamard sequences that may be used in the various aspects disclosed herein is shown in the table below. In one aspect of the VHT-STF for 8 streams, only the first 8 rows are used. Further, as the first row is all ones, no change will be necessary for it to work with legacy STF for the first stream or first transmitter because the 12 non-zero subcarrier values for the first stream will remain unchanged after the multiplication operation.

TABLE

Length 12 Hadamard Sequences

| 1 | 1 | 1 | 1 | 1 | 1 | 1 | 1 | 1 | 1 | 1 | 1 |
|---|---|---|---|---|---|---|---|---|---|---|---|
| 1 | −1 | 1 | −1 | 1 | 1 | 1 | −1 | −1 | −1 | 1 | −1 |
| 1 | −1 | −1 | 1 | −1 | 1 | 1 | 1 | −1 | −1 | −1 | 1 |
| 1 | 1 | −1 | −1 | 1 | −1 | 1 | 1 | 1 | −1 | −1 | −1 |
| 1 | −1 | 1 | −1 | −1 | 1 | −1 | 1 | 1 | 1 | −1 | −1 |
| 1 | −1 | −1 | 1 | −1 | −1 | 1 | −1 | 1 | 1 | 1 | −1 |
| 1 | −1 | −1 | −1 | 1 | −1 | −1 | 1 | −1 | 1 | 1 | 1 |
| 1 | 1 | −1 | −1 | −1 | 1 | −1 | −1 | 1 | −1 | 1 | 1 |
| 1 | 1 | 1 | −1 | −1 | −1 | 1 | −1 | −1 | 1 | −1 | 1 |
| 1 | 1 | 1 | 1 | −1 | −1 | −1 | 1 | −1 | −1 | 1 | −1 |
| 1 | −1 | 1 | 1 | 1 | −1 | −1 | −1 | 1 | −1 | −1 | 1 |
| 1 | 1 | −1 | 1 | 1 | 1 | −1 | −1 | −1 | 1 | −1 | −1 |

For 20 MHZ to support more than 12 spatial streams, because there may be only 12 orthogonal length-12 sequences, a combination of length-12 sequences and CDD may be used. In this case, the STF subcarriers k for transmission m are still defined as:

$$s_{mk} = w_{mk} s_k,$$

where $s_k$ are the 12 non-zero subcarrier values of the 802.11n STF symbol for a 20 MHz channel and $w_{mk}$ are +1/−1 values from the 12×12 orthogonal Hadamard matrix. In addition to the multiplication by the Hadamard sequences, a cyclic delay value of −200 ns may be applied to the transmitters 13-16. Other CD values may also be possible.

For generating 40 MHz STFs, in one approach length 24 Hadamard sequences may be used for the 24 non-zero sub-carriers of the 40 MHz STF. In this case, the STF subcarriers k for transmission m are defined as:

$$s_{mk} = w_{mk} s_k,$$

where $s_k$ are the 24 non-zero subcarrier values that may be replicated from the 20 MHz subcarriers and $w_{mk}$ are the +1/−1 values from a 24×24 orthogonal Hadamard matrix. In the example provided, 8 different length 24 Hadamard sequences are used to generate 8 streams. A similar approach may be used for generating STFs for higher MHz systems, such as 80 MHz. For example, for 80 MHz, 48 non-zero subcarriers $s_k$ may be generated from replicating the 20 MHz subcarriers. These subcarriers are then multiplied by $w_{mk}$, which are 8 different length 48 Hadamard sequences.

Figure 3:
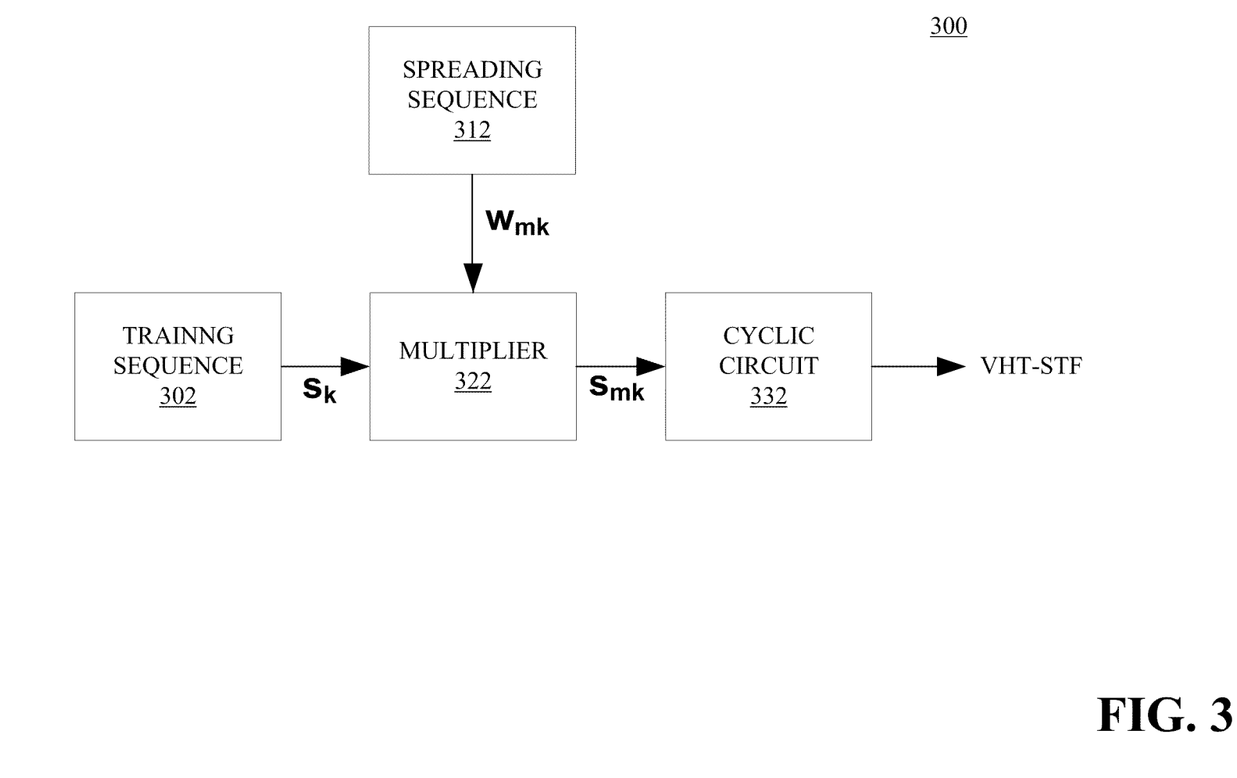
FIG. 3 is a block diagram illustrating an example of a VHT-STF generator that may be used in the wireless node of FIG. 2.

FIG. 3 illustrates an example of a VHT-STF generator 300 that may be used to generate the different VHT STFs described herein for use in the preamble unit 252, where a training sequence unit 302 provides the non-zero subcarrier values of $s_k$ to a multiplier unit 322 that also receives a spreading sequence $w_{mk}$ from a spreading sequence unit 312. The output from the multiplier unit 322, which is the subcarrier values $s_{mk}$, is then provided to a cyclic unit 332, which adds a desired CD.

Figure 4:
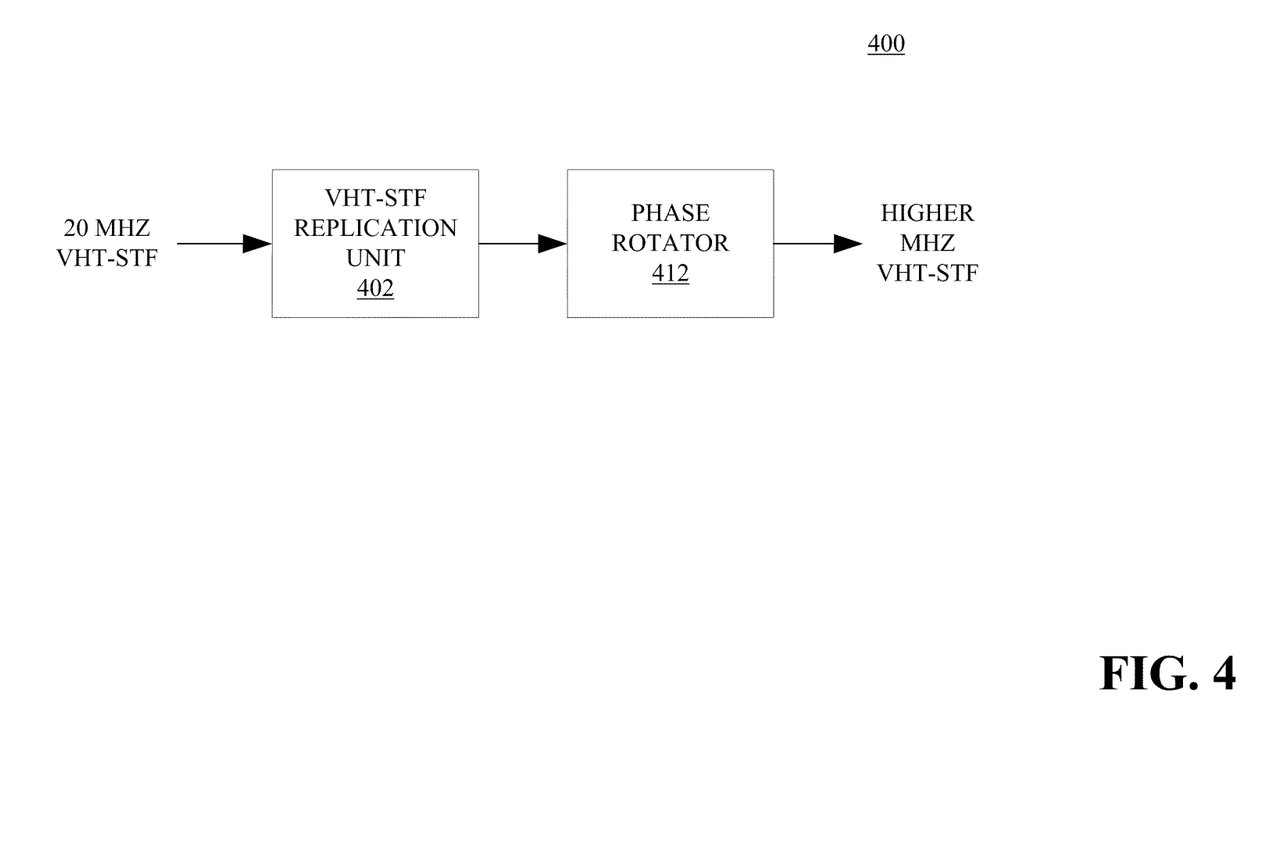
FIG. 4 is a block diagram illustrating an example of a higher MHz VHT-STF generation system that may be used with the VHT-STF generator of FIG. 3.

In another approach for generating 40 MHz and 80 MHz STFs, as illustrated in a higher MHz VHT-STF generation system 400 in FIG. 4, the VHT-STF for each additional 20 MHz subchannel is duplicated from the 20 MHz VHT-STF using a VHT-STF replication unit 402. Then, a phase rotation is applied across the subchannels through the use of a phase rotator 404, which may be the same as used for the VHT-LTF symbols. For example, for 80 MHz, multiplication factors {1, −1, 1, 1} may be applied to the 4 different 20 MHz subchannels. It should be noted that in the aspect of the approach as described, the output from FIG. 3 that is the generation of the 20 MHz VHT-STF may already have CDD applied. However, the CCD may also occur after the phase rotation to generate the different 20 MHz subchannels.

In one aspect of the disclosed approach, the modified STF keeps an 800 ns repetition interval, which means that existing 802.11n autocorrelation detection methods may still be used to detect the STF. Further, the modified STF may still be used in a mixed-mode preamble as 802.11n equipment will most likely detect it. Any receiver that can detect 11 n-GF with a possible cyclic delay spread of 600 ns, which is almost the entire 800 ns STF repetition interval, will almost certainly also detect the modified STF.

Figure 5:
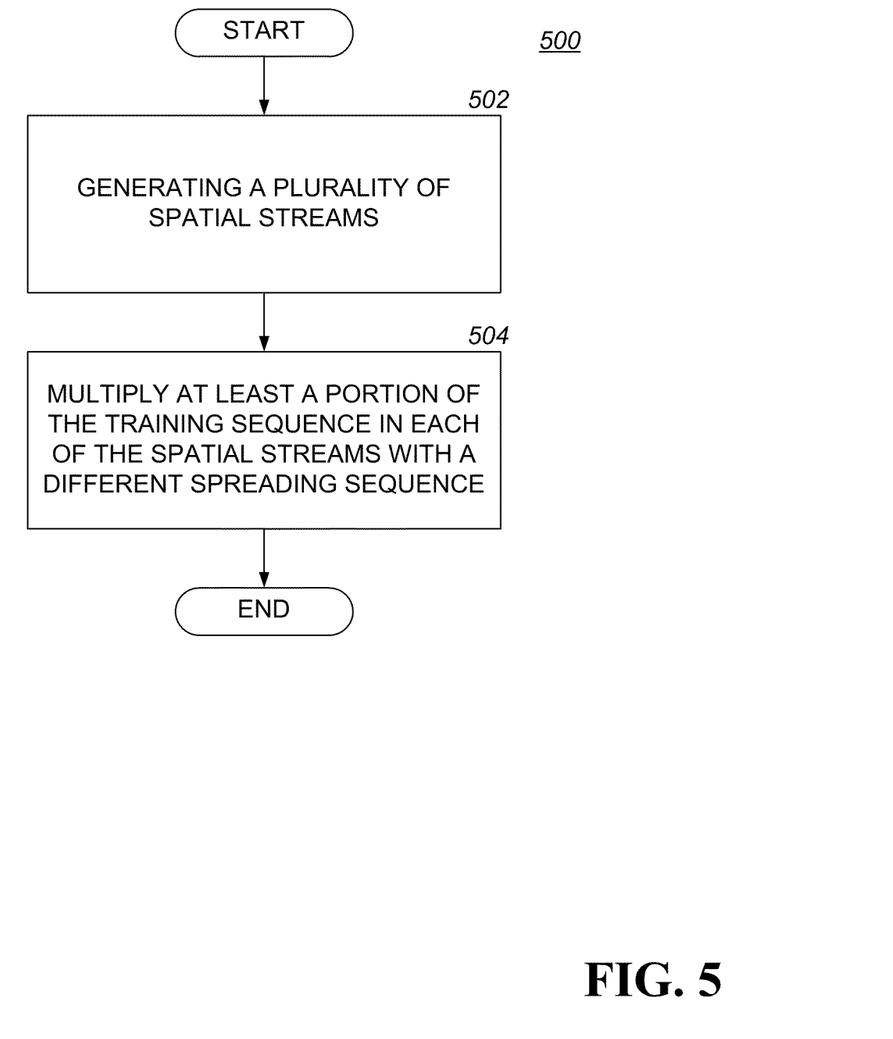
FIG. 5 is a flow diagram illustrating an example of a VHT-STF generation process.

FIG. 5 illustrates a VHT-STF generation process 500 that includes, at 502, generating a plurality of spatial streams, wherein each of the spatial streams includes a data packet having a training sequence. Then, at 504, multiplying at least a portion of the training sequence in each of the spatial streams with a different spreading sequence. As described herein, each of the training sequences includes a plurality of subcarriers, thus the subcarriers of the at least a portion of the training sequence in each of the spatial streams may be multiplied with a different spreading sequence. Each of the spreading sequences may include an orthogonal sequence. A cyclic delay may also be applied to one or more of the different spreading sequences.

As discussed in the example provided above, each of the training sequences includes k nonzero subcarriers, and each of the different spreading sequences may include k values. Further, where the spatial streams comprise m spatial streams, the at least a portion of the training sequence in each of the spatial streams may be multiplied with a portion of an m×k matrix comprising the different spreading sequences. The matrix used may be a Hadamard matrix or an FFT matrix comprising the different spreading sequences. The streams may then be provided to a plurality of antennas for transmission.

In another configuration, the LTF subcarriers of each transmission are multiplied with a different near orthogonal sequence. For a number of non-zero subcarriers used in 802.11n, there may not be known binary orthogonal patterns. However, it would be possible to use complex orthogonal patterns, such as the rows of a 114×114 FFT matrix for the case of 114 non-zero subcarriers. It is also possible to apply near orthogonal binary codes by using the first 114 rows and columns of a 128×128 Hadamard matrix. The above preamble has a long repetition time and therefore allows for more diverse CDD values. The above preamble allows the further reduction of the correlation between different transmitters.

It should be understood that the above schemes for obtaining training sequences for VHT wireless communications are not highly dependent on specific phase relations between the transmitters other than as noted above. These training sequences may have similar repetition intervals as those in systems such as 802.11n. Also, as discussed above, they may be detectable by legacy 802.11n receivers.

Figure 6:
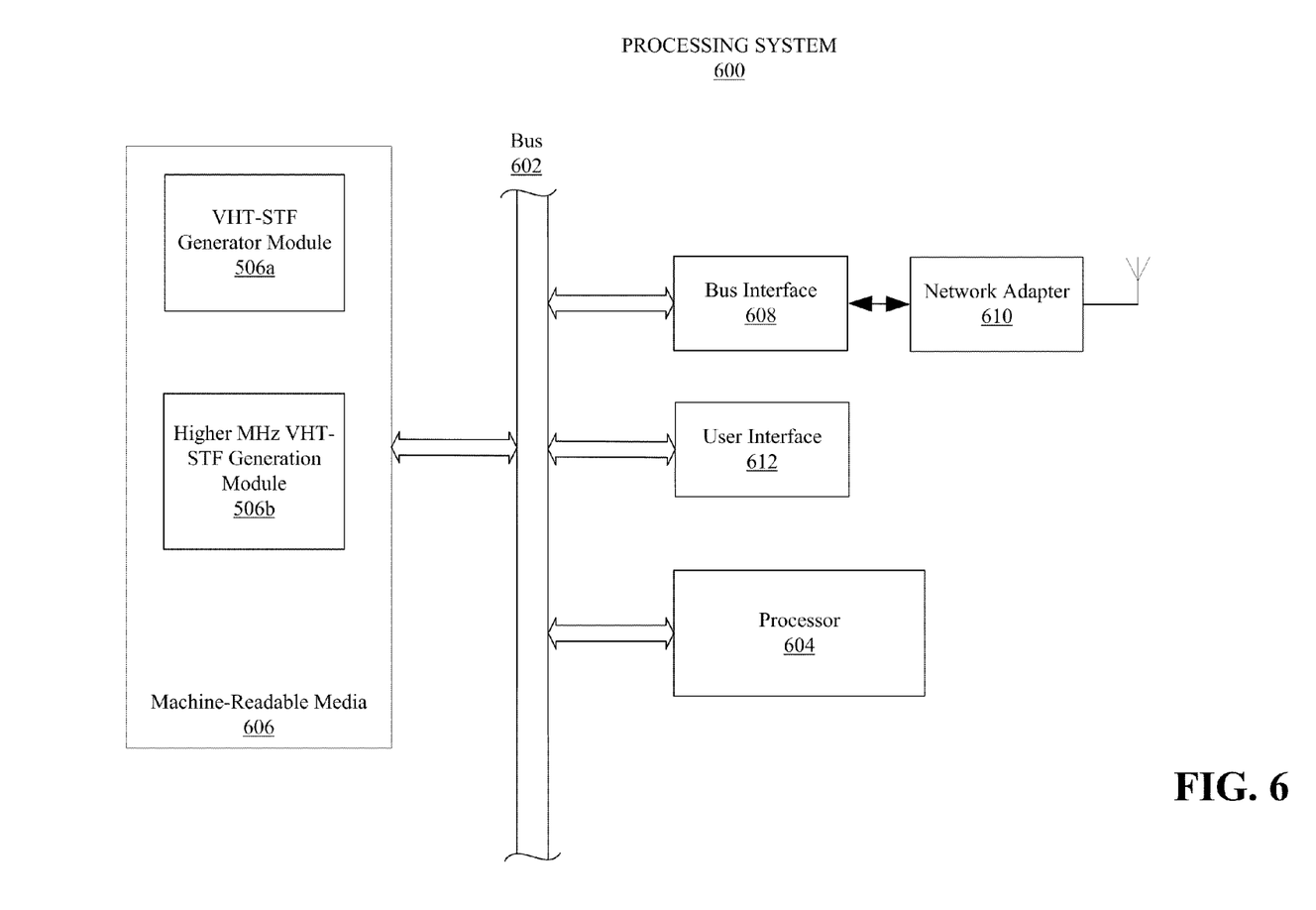
FIG. 6 is a block diagram of an apparatus that includes a processing system.

FIG. 6 illustrates a conceptual diagram illustrating an example of a hardware configuration for a processing system in a wireless node that may be used to implement the VHT-STF system described herein. In this example, the processing system 600 may be implemented with a bus architecture represented generally by a bus 602. The bus 602 may include any number of interconnecting buses and bridges depending on the specific application of the processing system 600 and the overall design constraints. The bus links together various circuits including a processor 604, machine-readable media 606 and a bus interface 608. The bus interface 608 may be used to connect a network adapter 610, among other things, to the processing system 600 via the bus 602. The network adapter 610 may be used to implement the signal processing functions of the PHY layer. In the case of an access terminal 120 (see FIG. 1), a user interface 612 (e.g., keypad, display, mouse, joystick, etc.) may also be connected to the bus. The bus 602 may also link various other circuits such as timing sources, peripherals, voltage regulators, power management circuits, and the like, which are well known in the art, and therefore, will not be described any further.

The processor 604 is responsible for managing the bus and general processing, including the execution of software stored on the machine-readable media 606. The processor 604 may be implemented with one or more general-purpose and/or special-purpose processors. Examples include microprocessors, microcontrollers, DSP processors and other circuitry that can execute software. Software shall be construed broadly to mean instructions, data or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In the hardware implementation illustrated in FIG. 6, the machine-readable media 606 is shown as part of the processing system 600 separate from the processor 604. However, as those skilled in the art will readily appreciate, the machine-readable media 606, or any portion thereof, may be external to the processing system 600. By way of example, the machine-readable media 606 may include a transmission line, a carrier wave modulated by data, and/or a computer product separate from the wireless node, all which may be accessed by the processor 604 through the bus interface 608. Alternatively, or in addition to, the machine readable media 606, or any portion thereof, may be integrated into the processor 604, such as the case may be with cache and/or general register files.

The processing system 600 may be configured as a general-purpose processing system with one or more microprocessors providing the processor functionality and external memory providing at least a portion of the machine-readable media 606, all linked together with other supporting circuitry through an external bus architecture. Alternatively, the processing system 600 may be implemented with an ASIC (Application Specific Integrated Circuit) with the processor 604, the bus interface 608, the user interface 612 in the case of an access terminal), supporting circuitry (not shown), and at least a portion of the machine-readable media 606 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 600 depending on the particular application and the overall design constraints imposed on the overall system.

The machine-readable media 606 includes various modules for supporting the operation of the processing system 600 to achieve the functionality described herein. For example, the machine-readable media 606 includes a VHT-STF generator module 606a that may be used to perform the VHT-STF generation described in the operation of the VHT-STF generator 300 of FIG. 3. The machine-readable media 606 also includes a higher MHz VHT-STF generation module 606b that may be used to perform the VHT-STF generation described in the operation of the higher MHz VHT-STF generation system 400 of FIG. 4. It should be understood that the functionality described herein may also be implemented using a combination of hardware or software, and the functionality provided by each of the "units" described in the VHT-STF generator 300 or the higher MHz VHT-STF generation system 400 may be implemented in software, hardware, or a combination of both.

It is understood that any specific order or hierarchy of steps described above is being presented to provide an example of the process involved in the preamble unit. Based upon design preferences, it is understood that the specific order or hierarchy of steps may be rearranged while remaining within the scope of the invention.

The preamble unit, the modulation unit, and the demodulation may be implemented with one or more general purpose processors, digital signal processors (DSP)s, application specific integrated circuits (ASIC)s, field programmable gate array (FPGA)s, programmable logic devices (PLD)s, other programmable logic components, discrete gate or transistor logic, discrete hardware components, or any combination thereof designed to perform the functions described herein. A general purpose processor may be a microprocessor, a controller, a microcontroller, a state machine, or any other circuitry that can execute software. Software shall be construed broadly to mean instructions, data, or any combination thereof, whether referred to as software, firmware, middleware, microcode, hardware description language, or otherwise. Software may be stored on machine-readable media or embedded in one or more components such as a DSP or ASIC. Machine-readable media may include various memory components including, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Machine-readable media may also be include a transmission line, a carrier wave modulated by data, and/or other means for providing software to the wireless node. The machine-readable may be embodied in a computer-program product. The computer-program product may comprise packaging materials.

Whether the above mentioned units are implemented in hardware, software, or a combination thereof will depend upon the particular application and design constraints imposed on the overall system. Skilled artisans may implement the described functionality in varying ways for each particular application, but such implementation decisions should not be interpreted as causing a departure from the scope of the invention.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wireless node, comprising:
   a plurality of antennas; and
   a processing system configured to generate a plurality of spatial streams, wherein each of the spatial streams comprises a data packet having a training sequence, the processing system being further configured to multiply at least a portion of the training sequence in each of the spatial streams with a different spreading sequence, wherein each said training sequence comprises a plurality of subcarriers, wherein the processing system is further configured to multiply the subcarriers of at least a portion of the training sequence in each of the spatial streams with a portion of an orthogonal Hadamard matrix comprising the different spreading sequences.

2. The wireless node of claim 1, wherein the processing system is further configured to multiply the subcarriers of the at least a portion of the training sequence in each of the spatial streams with a different spreading sequence.

3. The wireless node of claim 1, wherein each of the spreading sequences comprises an orthogonal sequence.

4. The wireless node of claim 1, wherein the processing system is further configured to apply a cyclic delay to one or more of the different spreading sequences.

5. The wireless node of claim 1, wherein each of the training sequences comprises k nonzero subcarriers.

6. The wireless node of claim 5, wherein each of the different spreading sequences comprises k values.

7. The wireless node of claim 5, wherein the spatial streams comprise m spatial streams, and wherein the processing system is further configured to multiply the at least a portion of the training sequence in each of the spatial streams with a portion of an m×k matrix comprising the different spreading sequences, and wherein the m×k matrix is the Hadamard matrix.

8. The wireless node of claim 7, wherein each of the training sequences comprises a plurality of subcarriers, and wherein the processing system is further configured to multiply the subcarriers of the at least a portion of the training sequence in each of the spatial streams with the portion of the Hadamard matrix.

9. The wireless node of claim 5, wherein the processing system is further configured to multiply the at least a portion of the training sequence in each of the spatial streams with a portion of the Hadamard matrix comprising the different spreading sequences.

10. The wireless node of claim 5, wherein the processing system is further configured to multiply the at least a portion of the training sequence in each of the spatial streams with a Fast Fourier Transform (FFT) matrix comprising the different spreading sequences.

11. The wireless node of claim 1, wherein the processing system is further configured to provide each of the spatial streams to a different one of the plurality of antennas.

12. A method for communications, comprising:
    generating a plurality of spatial streams, wherein each of the spatial streams comprises a data packet having a training sequence;
    multiplying at least a portion of the training sequence in each of the spatial streams with a different spreading sequence, wherein each said training sequence comprises a plurality of subcarriers; and
    multiplying the subcarriers of at least a portion of the training sequence in each of the spatial streams with a portion of an orthogonal Hadamard matrix comprising the different spreading sequences.

13. The method of claim 12, wherein the method further comprising multiplying the subcarriers of the at least a portion of the training sequence in each of the spatial streams with a different spreading sequence.

14. The method of claim 12, wherein each of the spreading sequences comprises an orthogonal sequence.

15. The method of claim 12, further comprising applying a cyclic delay to one or more of the different spreading sequences.

16. The method of claim 12, wherein each of the training sequences comprises k nonzero subcarriers.

17. The method of claim 16, wherein each of the different spreading sequences comprises k values.

18. The method of claim 16, wherein the spatial streams comprise m spatial streams, and wherein the method further comprises multiplying the at least a portion of the training sequence in each of the spatial streams with a portion of an m×k matrix comprising the different spreading sequences, and wherein the m×k matrix is the Hadamard matrix.

19. The method of claim 18, wherein each of the training sequences comprises a plurality of subcarriers, and wherein the method further comprises multiplying the subcarriers of the at least a portion of the training sequence in each of the spatial streams with the portion of the Hadamard matrix.

20. The method of claim 16, further comprising multiplying the at least a portion of the training sequence in each of the spatial streams with a portion of the Hadamard matrix comprising the different spreading sequences.

21. The method of claim 16, further comprising multiplying the at least a portion of the training sequence in each of the spatial streams with a Fast Fourier Transform (FFT) matrix comprising the different spreading sequences.

22. The method of claim 12, further comprising providing each of the spatial streams to a different antenna in a plurality of antennas.

23. A wireless node, comprising:
a plurality of antennas;
means for generating a plurality of spatial streams, wherein each of the spatial streams comprises a data packet having a training sequence;
means for multiplying at least a portion of the training sequence in each of the spatial streams with a different spreading sequence, wherein each said training sequence comprises a plurality of subcarriers; and
means for multiplying the subcarriers of at least a portion of the training sequence in each of the spatial streams with a portion of an orthogonal Hadamard matrix comprising the different spreading sequences.

24. The wireless node of claim 23, wherein the wireless node further comprises means for multiplying the subcarriers of the at least a portion of the training sequence in each of the spatial streams with a different spreading sequence.

25. The wireless node of claim 23, wherein each of the spreading sequences comprises an orthogonal sequence.

26. The wireless node of claim 23, further comprising means for applying a cyclic delay to one or more of the different spreading sequences.

27. The wireless node of claim 23, wherein each of the training sequences comprises k nonzero subcarriers.

28. The wireless node of claim 27, wherein each of the different spreading sequences comprises k values.

29. The wireless node of claim 27, wherein the spatial streams comprise m spatial streams, and wherein the apparatus further comprises means for multiplying the at least a portion of the training sequence in each of the spatial streams with a portion of an m×k matrix comprising the different spreading sequences, and wherein the m×k matrix is the Hadamard matrix.

30. The wireless node of claim 29, wherein each of the training sequences comprises a plurality of subcarriers, and wherein the wireless node further comprises means for multiplying the subcarriers of the at least a portion of the training sequence in each of the spatial streams with the portion of the Hadamard matrix.

31. The wireless node of claim 27, further comprising means for multiplying the at least a portion of the training sequence in each of the spatial streams with a portion of a the Hadamard matrix comprising the different spreading sequences.

32. The wireless node of claim 27, further comprising means for multiplying the at least a portion of the training sequence in each of the spatial streams with a Fast Fourier Transform (FFT) matrix comprising the different spreading sequences.

33. The wireless node of claim 23, further comprising means for providing each of the spatial streams to a different antenna in the plurality of antennas.

34. A computer program product, comprising:
a non-transitory computer-readable medium, comprising:
code for causing a wireless node to generate a plurality of spatial streams, wherein each of the spatial streams comprises a data packet having a training sequence;
code for causing the wireless node to multiply at least a portion of the training sequence in each of the spatial streams with a different spreading sequence, wherein each said training sequence comprises a plurality of subcarriers; and
code for causing the wireless node to multiply the subcarriers of at least a portion of the training sequence in each of the spatial streams with a portion of an orthogonal Hadamard matrix comprising the different spreading sequences.

35. The computer program product of claim 34, wherein the computer-readable medium further comprising code for multiplying the subcarriers of the at least a portion of the training sequence in each of the spatial streams with a different spreading sequence.

36. The computer program product of claim 34, wherein each of the spreading sequences comprises an orthogonal sequence.

37. The computer program product of claim 34, further comprising code for applying a cyclic delay to one or more of the different spreading sequences.

38. The computer program product of claim 34, wherein each of the training sequences comprises k nonzero subcarriers.

39. The computer program product of claim 38, wherein each of the different spreading sequences comprises k values.

40. The computer program product of claim 38, wherein the spatial streams comprise m spatial streams, and wherein the computer-readable medium further comprises code for multiplying the at least a portion of the training sequence in each of the spatial streams with a portion of an m×k matrix comprising the different spreading sequences, and wherein the m×k matrix is the Hadamard matrix.

41. The computer program product of claim 40, wherein each of the training sequences comprises a plurality of subcarriers, and wherein the computer-readable medium further comprises code for multiplying the subcarriers of the at least a portion of the training sequence in each of the spatial streams with the portion of the Hadamard matrix.

42. The computer program product of claim 38, further comprising code for multiplying the at least a portion of the training sequence in each of the spatial streams with a portion of a Hadamard matrix comprising the different spreading sequences.

43. The computer program product of claim 38, further comprising code for multiplying the at least a portion of the training sequence in each of the spatial streams with a Fast Fourier Transform (FFT) matrix comprising the different spreading sequences.

44. The computer program product of claim 34, further comprising code for providing each of the spatial streams to a different antenna in a plurality of antennas.

45. An apparatus for communications, comprising:

a plurality of antennas; and a processing system configured to generate a plurality of spatial streams for transmission on the plurality of antennas, wherein each of the spatial streams comprises a data packet having a training sequence, the processing system being further configured to multiply at least a portion of the training sequence in each of the spatial streams with a different spreading sequence, wherein each said training sequence comprises a plurality of subcarriers, wherein the processing system is further configured to multiply the subcarriers of at least a portion of the training sequence in each of the spatial streams with a portion of an orthogonal Hadamard matrix comprising the different spreading sequences.

46. A wireless node, comprising:

a plurality of antennas;

a training sequence unit configured to provide a plurality of training sequences for a plurality of spatial streams, wherein each of the spatial streams comprises a data packet having a training sequence, and wherein each said training sequence comprises a plurality of subcarriers;

a spreading sequence generator configured to provide a different spreading sequence for each of the spatial streams; and a multiplier configured to combine the plurality of training sequences with a respective different spreading sequence and to multiply the subcarriers of at least a portion of the training sequence in each of the spatial streams with a portion of an orthogonal Hadamard matrix comprising the different spreading sequences.

47. A method for communications comprising:

providing a plurality of training sequences for a plurality of spatial streams, wherein each of the spatial streams comprises a data packet having a training sequence, and wherein each said training sequence comprises a plurality of subcarriers;

providing a different spreading sequence for each of the spatial streams;

multiplying the subcarriers of at least a portion of the training sequence in each of the spatial streams with a portion of an orthogonal Hadamard matrix comprising the different spreading sequences; and combining the plurality of training sequences with a respective different spreading sequence.

* * * * *